UNITED STATES PATENT OFFICE.

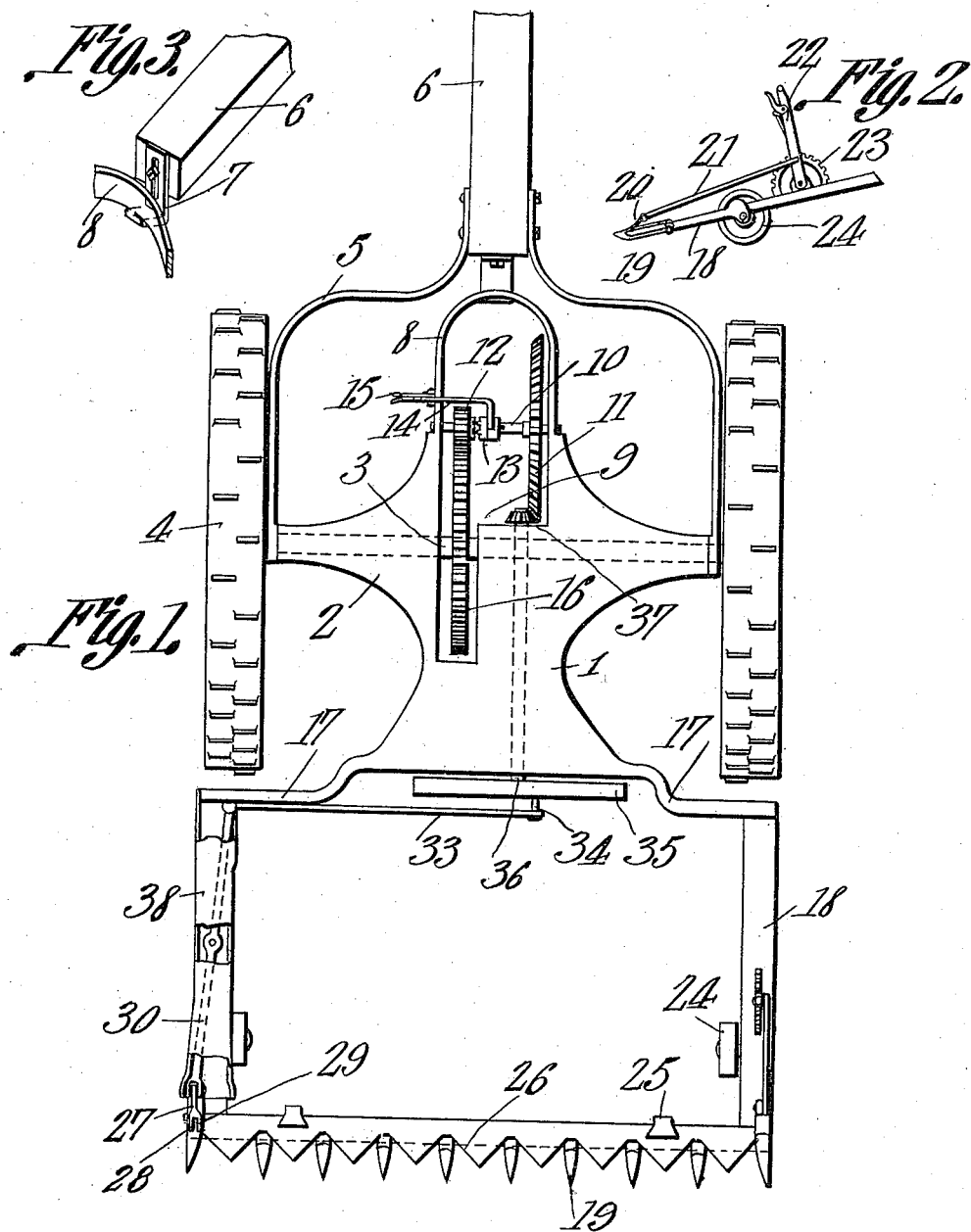

HOMER HUE SPENARD, OF REMINGTON, INDIANA.

LAWN-MOWER.

984,861.  Specification of Letters Patent.  Patented Feb. 21, 1911.

Application filed May 17, 1910. Serial No. 561,838.

*To all whom it may concern:*

Be it known that I, HOMER H. SPENARD, a citizen of the United States, residing at Remington, in the county of Jasper and State of Indiana, have invented a new and useful Lawn-Mower, of which the following is a specification.

This invention relates to lawn mowers of that type utilizing a reciprocating sickle and one of the objects of the invention is to provide a simple and durable machine of this character having means whereby the finger bar and the sickle mounted thereon can be readily adjusted to any desired angle relative to the supporting structure.

Another object is to provide improved operating mechanism for transmitting motion from one of the supporting wheels to the sickle, said mechanism including a fly wheel for facilitating the actuation of the same.

Another object is to provide means whereby the sickle operating mechanism can be readily placed into or out of operative relation with its drive wheel.

With these and other objects in view the invention consists of certain novel details of construction and combinations of parts hereinafter more fully described and pointed out in the claims.

In the accompanying drawings the preferred form of the invention has been shown.

In said drawings:—Figure 1 is a plan view of a lawn mower constructed in accordance with the present invention, a portion thereof being broken away. Fig. 2 is a side elevation of a portion of said lawn mower. Fig. 3 is a perspective view showing the connection between the handle and the intermediate portion of the body of the machine.

Referring to the figures by characters of reference 1 designates the body of the machine, the same being provided with laterally extending arms 2 within which is journaled an axle 3, there being supporting wheels 4 mounted on the ends of the axle, and operatively connected thereto by pawls and ratchets (not shown) so as to rotate it while the machine is being moved forward. Curved straps 5 are pivotally connected to the axle 3 at points between the arms 2 and wheels 4 and converge rearwardly and are secured to a handle 6. An angular bracket 7 is adjustably mounted upon the end of this handle and projects under a yoke 8 which extends rearwardly from the body 1 and across one end of an opening 9 formed within the body. A shaft 10 extends transversely of this opening and has a gear 11 keyed or otherwise fastened to it while another gear 12 is loosely mounted on the said shaft 10 and is adapted to be locked upon the shaft by means of a clutch 13 which is feathered on said shaft and is adapted to be operated by a rod 14 connected to a small lever 15. The gear 12 meshes at all times with a large drive gear 16 which is secured to the axle 3 and is arranged in the opening 9.

Front arms 17 extend laterally from the front end of the body 1 and are provided at their terminals with forwardly extending side strips 18 preferably parallel. These strips have a finger bar 19 hingedly connected to the front ends thereof, said finger bar being provided, adjacent one of its ends, with an upstanding finger 20 connected, by means of a rod 21, with a lever 22 which is fulcrumed on one of the side strips 18 and has any suitable means, such as a segment 23 and a pawl for locking the lever in any position to which it may be adjusted. Obviously by means of this lever the finger bar can be tilted to any desired angle relative to the side strips 18. Supporting rollers or wheels 24 are connected to the side strips and serve to support them out of contact with the ground.

Guide lugs 25 are arranged upon the rear portion of the finger bar 19 and a sickle 26 is slidably mounted on the finger bar and within the guide lugs, one end of the sickle being provided with an upstanding lug 28. This lug projects into a fork 29 formed at one end of an extension 27 hingedly connected to a centrally fulcrumed lever 30. The other end of said lever has a ball and socket connection with a pitman 33 connected to a wrist pin 34 projecting from a fly wheel 35. The said fly wheel is secured to a longitudinal shaft 36 which is journaled in the body 1 and a gear 37 is attached to the rear end of the said shaft and meshes at all times with the gear 11.

A covering plate 38 may be attached to that side strip 18 on which the lever 30 is mounted so as to conceal the said lever and protect it from dirt, grass, etc., and a casing may also be used to house the gears 16, 12, 11 and 37.

In using the device which has been described the clutch 13 is shifted into engagement with the gear 12 and the finger bar 19 is adjusted to a desired angle relative to the side strips 18, the lever 22 being employed for this purpose. The angular member 7 can then be adjusted upon the handle 6 so as to give any desired amount of vertical play of the handle relative to the body 1. After the parts have thus been adjusted, the machine can be moved forward and the drive wheels 4 will rotate the axle and the gear 16 and this gear will in turn drive gear 12 and shaft 10. Motion will therefore be transmitted to the gears 11 and 37 to the shaft 36 and fly wheel 35. Lever 30 will therefore be oscillated and will cause a reciprocation of the sickle 26.

Importance is attached to the fact that the body portion 1, its arms, and the side strips are all in one piece of metal and the entire device is thus greatly simplified. The mechanism will not readily get out of order and is all readily accessible for the purpose of repairing or cleaning it.

It is of course to be understood that when the axle 3 extends entirely across the body portion 1, it is necessary to locate the shaft 36 at a different elevation, the said shaft either extending above or below the axle.

Various changes can of course be made in the construction and arrangement of the parts without departing from the spirit or sacrificing any of the advantages of the invention as defined in the appended claims.

What is claimed is:—

1. A mower including a body having forwardly extending side members, supporting wheels at the sides of said body portion, supporting wheels connected to the side members, a finger bar tiltably mounted upon the side members, means for shifting the same, a sickle mounted to reciprocate upon the finger bar, a lever engaging the sickle, a housing for said lever, and mechanism operated by one of the supporting wheels of the body portion for actuating the lever.

2. A mower including a wheel supported body, forwardly extending side members movable with the body, supporting wheels therefor, a finger bar pivotally connected to the side members, a sickle mounted to reciprocate upon the bar, means for transmitting motion from said sickle to one of the supporting wheels of the body, the supporting wheels of the side members constituting means for holding the finger bar out of contact with the ground, and means mounted upon the upper face of one of the side members and engaging the finger bar, for adjusting and locking said bar relative to the side members and during the reciprocation of the sickle.

3. A mower including a body, supporting wheels therefor, forwardly extending side members, a centrally disposed fly wheel rotatable in a plane extending transversely of the machine, said wheel being interposed between the side members, means for rotating the fly wheel, a finger-bar pivotally connected to the side members, wheels connected to said members for supporting the bar out of contact with the ground, means upon one of the side members for adjusting the bar and locking it at a predetermined angle relative to the side members, a sickle mounted to reciprocate upon the bar, a lever fulcrumed on one of the side members, a connection between the lever and sickle, and a connection between the lever and the fly wheel.

In testimony that I claim the foregoing as my own, I have hereto affixed my signature in the presence of two witnesses.

HOMER HUE SPENARD.

Witnesses:
T. PONTO,
D. A. BIEKEL.